United States Patent [19]

Mizokami

[11] Patent Number: 4,473,744
[45] Date of Patent: Sep. 25, 1984

[54] PHOTOMETRIC APPARATUS FOR CAMERA

[75] Inventor: Kazunori Mizokami, Hachioji, Japan

[73] Assignee: Olympus Optical Company, Ltd., Tokyo, Japan

[21] Appl. No.: 335,588

[22] Filed: Dec. 29, 1981

[51] Int. Cl.³ .............................................. G03B 7/083
[52] U.S. Cl. .................. 250/214 P; 354/425
[58] Field of Search ......... 250/214 P, 214 L, 214 RC, 250/214 R; 354/24, 50, 51, 425, 427, 459

[56] References Cited

U.S. PATENT DOCUMENTS

| 4,100,407 | 7/1978 | Takahashi | 250/214 P |
| 4,390,258 | 6/1983 | Mizokami | 250/214 P X |
| 4,408,852 | 10/1983 | Yamasaki | 354/24 |

OTHER PUBLICATIONS

Japanese Laid Open Patent Application; Serial No. Sho 52-114134, filed Sep. 22, 1977; Inventor Masahiro Kawasaki.

Primary Examiner—Edward P. Westin
Attorney, Agent, or Firm—Louis Weinstein

[57] ABSTRACT

A photometric apparatus for a camera includes a diode for logarithmic compression and a semiconductor analog switch in series connection between an output terminal of a first operational amplifier and a second operational amplifier forming an integration circuit by connecting a photoelectric transducer element for a photometry purpose. A logarithimic compression signal for an exposure display and a photocurrent integration signal for an exposure control are derived from the first and the second operational amplifier, respectively.

9 Claims, 6 Drawing Figures

PHOTOMETRIC APPARATUS FOR CAMERA

BACKGROUND OF THE INVENTION

The invention relates to a photometric apparatus for a camera, and more particularly, to a photometric apparatus for a camera which develops a logarithmic compression signal for an exposure display and an integration signal for an exposure control.

There has been proposed such a photometric apparatus of the type that is constructed as shown in FIG. 1 (Japanese Laid Open Patent Publication No. 54-48235). The apparatus shown in FIG. 1 includes an operational amplifier 1 which has an inverting input terminal ⊖ and a non-inverting input terminal ⊕ to which a reference voltage $V_{REF}$ is applied. A photoelectric transducer element 2 such as a photodiode is connected betwen the input terminals ⊖ and ⊕. An output terminal of the amplifier 1 is connected to a contact terminal c of a timing switch 3 whose connection is switched from a contact terminal a to a contact terminal b in synchronism with the running of a first shutter blind. A diode 4 for logarithmic compression is connected between the inverting terminal ⊖ of the amplifier 1 and the contact terminal a. An integration capacitor 5 is connected between the inverting terminal ⊖ of the amplifier 1 and the contact terminal b. Resistors 6 and 7 are connected between the non-inverting terminal ⊕ of the amplifier 1 and contact terminals a and b, respectively.

With the construction of the photometric apparatus described above, when a photocurrent flows through the transducer element 2, a logarithmic compression signal for an exposure display to be fed to a view finder display system is derived from an output terminal 8 connected to the contact terminal a. When the contact terminal c is connected to the contact terminal b in synchronism with running of the first shutter blind upon shutter releasing, an integration signal for an exposure control is derived from an output terminal 9 connected to the contact terminal b.

In the photometric apparatus shown above, however, the mechanical type timing switch 3 and the externally disposed integration capacitor 5 are used and therefore there are difficulties in making it into an integrated circuit (IC) and a limitation upon its miniaturization. In addition, when the mechanical type timing switch 3, which is a transfer switch, is employed, there is an open connection interval in which the contact terminal c is connected to none of the other contact terminals as the contact terminal c changes connections from the contact terminal a to the contact terminal b and thereby during which a feedback loop of the amplifier 1 is disconnected, resulting in no feedback. At this moment, since an output of the amplifier 1 becomes unstable and both terminal voltages across the integration capacitor 5 are not maintained at zero volts, a malfunction may be caused by unstable circuit behavior such as a time lag of an integration initiation. Therefore, a particular means is generally required to compensate for the above noted problem. In addition, since the diode 4 for logarithmic compression is disposed in the feedback loop between the output terminal and the inverting input terminal ⊖ of the amplifier 1, it needs a time duration to charge the diode 4 with its junction capacitance, especially a few seconds from turning a power supply on to obtaining a proper logarithmic compression output when light from an object being photographed is poor. Accordingly, it is to be noted that in such a case also a particular measure is practically required to reduce the time duration in prior art photometric apparatus.

SUMMARY OF THE INVENTION

It is an object of the invention to provide a photometric apparatus for a camera including a pair of operational amplifiers between which a feedback loop circuit is formed, the first operational amplifier being connected in such a manner that its output terminal applies a reference voltage through a diode for logarithmic compression and a semiconductor analog switch to a non-inverting input terminal of the second operational amplifier and a photoelectric transducer element for a photometry purpose being connected to the input terminal of the second operational amplifier so as to form a photocurrent integration circuit.

It is another object of the invention to provide a photometric apparatus for a camera which effects a photocurrent integration with the junction capacitance of a photoelectric transducer element for a photometry purpose.

According to the invention, since a mechanical type transfer switch is not utilized, it is possible to minimize the photometric apparatus size in whole and to increase its reliability.

According to the invention, since the output of the second operational amplifier which forms an integration circuit is fed back into the first operational amplifier and the integration capacitor which is connected to the non-inverting input terminal of the second operational amplifier is charged from the output of the first operational amplifier through the logarithmic compression diode and the semiconductor analog switch, it is possible to obtain an extremely high response by producing a logarithmic compression signal from the first operational amplifier simultaneously with turning a power supply on. Further, when a first stage producing the logarithmic compression signal is transferred to a second stage producing an integration signal by a photocurrent, there is no unstable circuit behavior and thereby the integration signal with high accuracy can be obtained from the second operational amplifier. It will be seen that no particular compensation circuit is required, thus rendering the construction extremely simple.

According to the invention, as the photocurrent integration is effected with a junction capacitance of the photoelectric transducer element without using an externally disposed integration capacitor, it is possible to promote a further miniaturization of the photometric circuit and to increase its reliability.

DETAILED DESCRIPTION OF PREFERRED EMBODIMENTS

Figure 1:
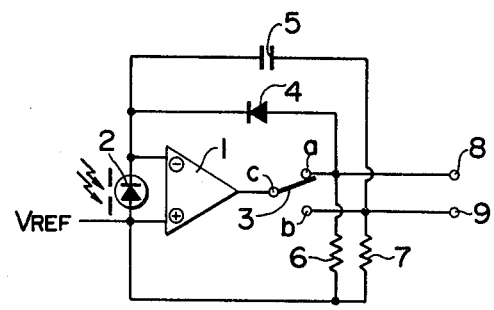
FIG. 1 is an electric circuit diagram illustrating an example of a photometric apparatus of the prior art.
Figure 2:
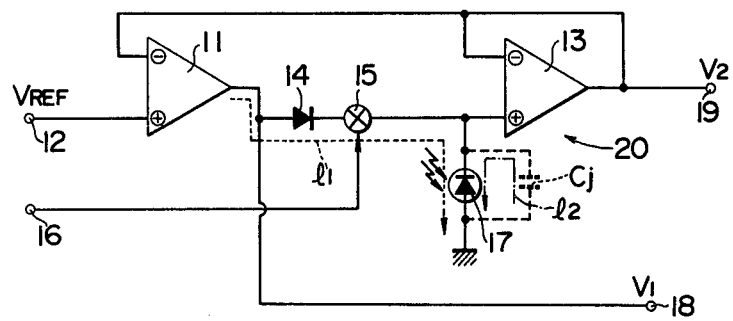
FIG. 2 is an electric circuit diagram of a photo-metric apparatus according to one embodiment of the invention.

Referring to FIG. 2, which is an electric circuit diagram of a photometric apparatus according to an embodiment of the invention, a non-inverting input terminal ⊕ of a first operational amplifier 11 is connected to a terminal 12 to which a reference voltage $V_{REF}$ is applied, and an inverting input terminal ⊖ of the first operational amplifier 11 is connected to an inverting input terminal ⊖ of a second operational amplifier 13 and to the output terminal of the second amplifier 13. The output terminal of the first amplifier 11 is connected to the anode of a diode 14 for logarithmic compression and the cathode of the diode 14 is connected through a semiconductor analog switch 15 to the non-inverting input terminal ⊕ of the second operational amplifier 13. The analog switch 15 is opened and closed by a trigger signal applied to a control terminal 16. Specifically, the trigger signal is changed from an "H" level to an "L" level in synchronism with running of a first shutter blind and thereby the analog switch 15 is turned from on to off.

A photoelectric transducer element 17 for a photometry purpose such as a photodiode is connected with its cathode facing toward the non-inverting input terminal ⊕ side of the second amplifier 13 between the latter and the ground. A photocurrent integration circuit 20 is formed with the transducer element 17 and the second amplifier 13. The output terminal of the first amplifier 11 is connected to an output terminal 18 for a display signal and the output terminal of the second amplifier 13 is connected to an output terminal 19 for a control signal. Since the photometric apparatus does not use a mechanical switch and a capacitor, it is possible to construct its circuit in one package unit by using an IC.

In operation, a reference voltage $V_{REF}$ is applied to the terminal 12 and the trigger signal at the "H" level is applied to the terminal 16 by turning a power supply of the camera on. When the trigger signal at the "H" level is applied, the analog switch 15 is turned on, and thereby the output of the first amplifier 11 is fed through the diode 14 and the analog switch 15 to the second amplifier 13 and the output of the second amplifier 13 is fed through the feedback loop to the inverting input terminal ⊖ of the first amplifier 11. In such condition, when the transducer element 17 receives light reflected from an object being photographed, a photocurrent Ip in accordance with a quantity of the received light flows through the channel $l_1$ including the first amplifier 11, diode 14, analog switch 15 and transducer element 17 which is reversely biased with the reference voltage $V_{REF}$ between the anode and the cathode thereof. The cathode potential of the transducer element 17 is at the reference voltage $V_{REF}$ and therefore an output voltage $V_1$ fed from the first amplifier 11 to the output terminal 18 is as follows;

$$V_1 = V_{REF} + I_p R_{ON} + \frac{kT}{q} \ln \frac{Ip}{Is} \quad (1)$$

where $R_{ON}$ is the resistance when the analog switch 15 is on, k is the Boltzmann constant and q the charge of an electron. Is represents a backward saturation current of the diode 14.

In the equation (1), since $I_p R_{ON} < V_{REF}$ and $$\frac{kT}{q} \ln \frac{Ip}{Is},$$

then $$V_1 \approx V_{REF} + \frac{kT}{q} \ln \frac{Ip}{Is} \quad (2)$$

Figure 3:
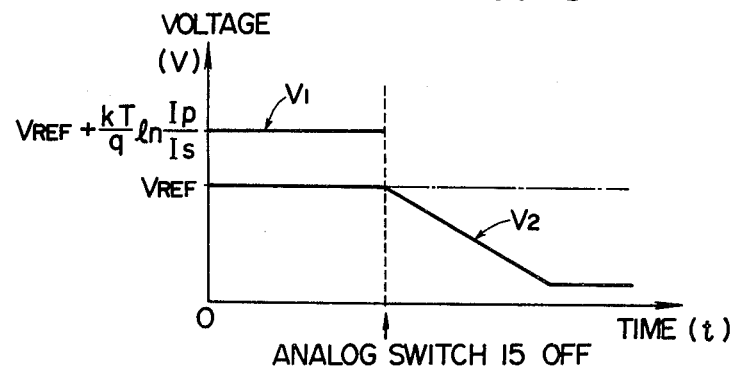
FIG. 3 is an output voltage waveform diagram of the photometric apparatus shown in FIG. 2.

Specifically, the logarithmic compression signal $V_1$ which is greater than the reference voltage $V_{REF}$ by a constant voltage $$\left( \frac{kT}{q} \ln \frac{Ip}{Is} \right)$$

corresponding to the photocurrent Ip is derived from the output terminal 18, as shown in FIG. 3. Since the transducer element 17 is disposed at the low output impedance side of the first amplifier 11, the transducer element 17 with its junction capacitance Cj may be charged at a high rise rate and the logarithmic compression signal having the proper voltage described above is instantly derived from the output terminal 18. The logarithmic compression signal is fed to the view finder display system for an exposure display. At this time, the reference voltage $V_{REF}$ which is the cathode potential of the transducer element 17 is obtained at the output terminal 19 for a control signal.

Thereafter, upon shutter releasing the first shutter blind starts to run and simultaneously with the running the trigger signal is turned from the "H" level to the "L" level to thereby turn the analog switch 15 off. Then, the channel of the photocurrent Ip which is flowing from the first amplifier 11 through the diode 14 and the analog switch 15 to the transducer element 17 is disconnected and then the charge which has been stored in the junction capacitance Cj of the transducer element 17 is discharged through the junction capacitance Cj as the photocurrent Ip flows through the channel $l_2$ shown in FIG. 2. Accordingly, an output voltage $V_2$ fed from the second amplifier 13 to the terminal 19 is as follows:

$$V_2 = V_{REF} - \frac{Ip}{Cj} t \quad (3)$$

Specifically, after the analog switch 15 is turned off the junction capacitance Cj of the transducer element 17 acts as an integration capacitor. In the equation (3), t represents a time duration of the integration, namely, a time elapsed after the analog switch 15 is turned off. The trigger signal is turned to the "L" level and in turn the integration signal having the voltage $V_2$ which decreases gradually from the reference voltage $V_{REF}$ after the analog switch 15 is turned off, as shown in FIG. 3, is derived from the terminal 19. The integration signal voltage $V_2$ is fed to a comparator (not shown) to be compared with a value predetermined by a shutter speed, a diaphragm aperture, a film speed and the like. When the voltage $V_2$ reaches the predetermined voltage value, the output of the aforementioned comparator is fed to a control circuit of a second shutter blind to initiate running of a second shutter blind.

The moment the integration voltage $V_2$ for an exposure control is derived from the terminal 19 by turning the analog switch 15 from on to off with the trigger signal in synchronism with a signal for shutter releasing, the logarithmic compression voltage $V_1$ for an exposure display which has been derived from the terminal 18 so far will become unsettled because of momentary disconnection of the feedback loop of the first amplifier 11. However, even though the output of the first amplifier 11 becomes unsettled, the integration circuit 20, which is independent of the first amplifier 11, can effect a reliable integration starting from the reference voltage $V_{REF}$. Where necessary, provided that the voltage $V_1$ is allowed to be stored by a means after the synchronization with the trigger signal of the "L" level, a photometric value with the stored value $V_1$ can be produced in the view finder display system even after shutter releasing.

The trigger signal is returned from the "L" level to "H" level after termination of the second shutter blind running or in cooperation with a winding motion of a shutter and a film.

Figure 4:
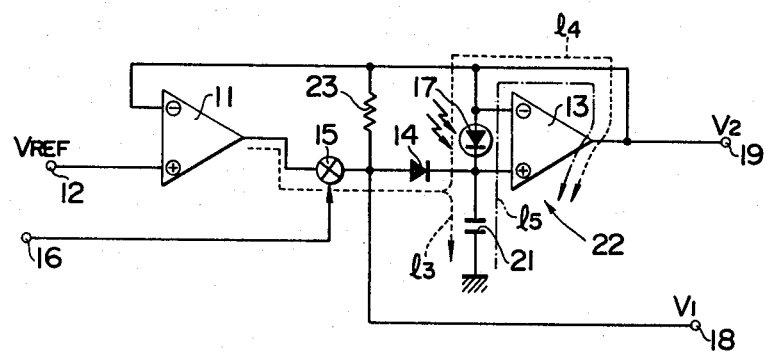
FIG. 4 is an electric circuit diagram of a photo-metric apparatus according to another embodiment of the invention.

Referring to FIG. 4, which is an electric circuit diagram of a photometric apparatus according to another embodiment of the invention, the output terminal of a first operational amplifier 11 is connected through a semiconductor analog switch 15 to the anode of a logarithmic compression diode 14 and the cathode of the diode 14 is connected to the non-inverting input terminal ⊕ of a second operational amplifier 13. A photoelectric transducer element 17 for a photometry purpose is connected with its cathode facing to the non-inverting input terminal ⊕ side of the second amplifier 13 between the inverting input terminal ⊖ and the non-inverting input terminal ⊕ of the second amplifier 13. An integration capacitor 21 is connected between the non-inverting input terminal ⊕ of the second amplifier 13 and the ground. A photocurrent integration circuit 22 is formed with the capacitor 21, transducer element 17 and second amplifier 13. The junction between the analog switch 15 and the diode 14 is connected to an output terminal 18 for a display signal and a resistor 23 with a high resistance is connected between the last mentioned junction and the inverting input terminal ⊖ of the second amplifier 13. The resistor 23 is provided for preventing a leakage current from flowing into the diode 14 when the analog switch 15 is turned off. The output terminal of the second amplifier 13 is connected to an output terminal 19 for a control signal and to the inverting input terminal ⊖ of the second amplifier 13 and the first amplifier 11. The non-inverting input terminal ⊕ of the first amplifier 11 is connected to a reference voltage terminal 12 in the same manner as in the photometric apparatus shown in FIG. 2.

In operation, when a power supply of a camera is turned on, the trigger signal at the control terminal 16 is turned to the "H" level with a shutter charged and thereby the output of the first amplifier 11 is fed through the analog switch 15 and the diode 14 to the second amplifier 13 and the output of the latter is fed back to the first amplifier 11 in the same manner as in the embodiment previously mentioned. Therefore, upon throw on of the power supply the reference voltage $V_{REF}$ is applied to the non-inverting input terminal ⊕ of the second amplifier 13 and the capacitor 21 is charged instantly by the output of the first amplifier 11 through the channel $l_3$ including the analog switch 15 and the diode 14 to the reference voltage $V_{REF}$. In such condition, when the transducer element 17 receives light from an object being photographed, a photocurrent $I_p$ flows in the transducer element 17 through the channel $l_4$ including the first amplifier 11, analog switch 15, diode 14, transducer element 17 and the output terminal of second amplifier 13. Accordingly, a logarithmic compression signal representing a voltage $$V_1 = V_{REF} + \frac{kT}{q} \ln \frac{I_p}{I_s}$$

indicated by the equation (2) is derived from the output terminal 18 as described in the previous embodiment.

Upon shutter releasing, the analog switch 15 is turned off and thereby the channel $l_4$ for the photocurrent $I_p$ of the transducer element 17 is disconnected. Thereupon, the charge stored in the capacitor 21 is discharged through the channel $l_5$ including the transducer element 17 as the photocurrent $I_p$ flows. Consequently, an integration signal similar to the voltage indicated in the equation (3) is derived from the output terminal 19. While $C_j$ in the equation (3) represents the junction capacitance of the transducer element 17, the capacitance of the capacitor 21 in the embodiment is represented with C and thus the output voltage $V_2$ is as follows.

$$V_2 = V_{REF} - \frac{I_p}{C} t \qquad (4)$$

As shown in FIG. 3, the integration voltage $V_2$ which decreases gradually from the reference voltage $V_{REF}$ after the analog switch 15 is turned off is derived from the output terminal 19.

In addition, when the trigger signal is turned to the "L" level to turn the analog switch 15 off, the output of the first amplifier 11 will become unsettled for the moment as described in the foregoing. However, at this time both ends of the diode 14 are maintained in zero biased condition by the high resistance resistor 23 to prevent a leakage current from flowing into the diode 14. Consequently, the integration circuit 22 initiates a reliable integration after the analog switch 15 is turned off and thus an integration signal can be obtained without an error from the terminal 19. It is to be also noted that in the embodiment, provided that the logarithmic compression voltage $V_1$ which has been derived from the terminal 18 is allowed to be stored by a means after the synchronization with the trigger signal in the "L" level while the trigger signal is in the "H" level, a photometric value with the voltage $V_1$ can be displayed even after a shutter is released.

Figure 5:
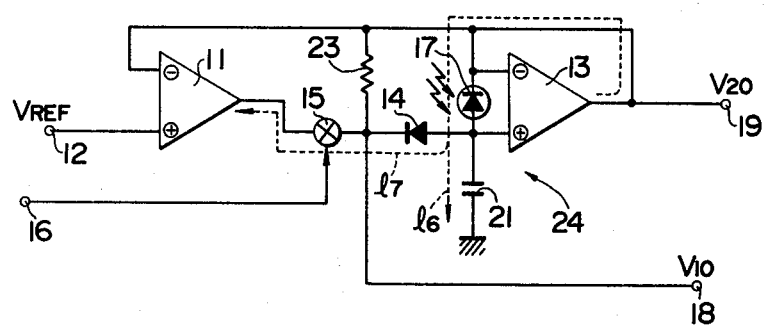
FIG. 5 is an electric circuit diagram of a photo-electric apparatus according to a further embodiment of the invention.

Referring to FIG. 5, which is an electric circuit diagram of a photometric apparatus according to a further embodiment of the invention, the photometric circuit is shown in such a manner that the photoelectric transducer element 17 and the logarithmic compression diode 14 in the photometric apparatus shown in FIG. 4 are connected with their polarities reversed and other circuit parts are connected in like manner as the apparatus shown in FIG. 4. A photoelectric transducer element 17 has its cathode connected to the inverting input terminal ⊖ of a second operational amplifier 13 and its anode connected to the non-inverting input terminal ⊕ thereof. A logarithmic compression diode 14 has its anode connected to the non-inverting input terminal ⊕ of the second amplifier 13 and its cathode connected through a semiconductor analog switch 15 to the output terminal of the first amplifier 11. An integrating circuit 24 is formed with the second amplifier 13, an integration capacitor 21 and the photoelectric transducer element 17.

In operation, when a power supply is turned on, the trigger signal is turned to the "H" level and the analog switch 15 is turned on, whereby a feedback loop circuit is formed by the first and the second amplifiers 11 and 13. Thus, the reference voltage $V_{REF}$ is applied to the non-inverting input terminal $\oplus$ of the second amplifier 13. A photocurrent Ip of the transducer element 17 flows through the channel l$_6$ including the output terminal of the second amplifier 13, transducer element 17 and capacitor 21. The capacitor 21 is charged to the reference voltage $V_{REF}$. In addition, after the photocurrent Ip has been charged in the capacitor 21, the photocurrent Ip flows through the channel l$_7$ including the transducer element 17, diode 14, analog switch 15 and the output terminal of the first amplifier 11 and thereby an output voltage $V_{10}$ fed from the cathode side of the diode 14 to a terminal 18 for a display signal is obtained as follows.

$$V_{10} = V_{REF} - \frac{kT}{q} \ln \frac{Ip}{Is} \quad (5)$$

Figure 6:
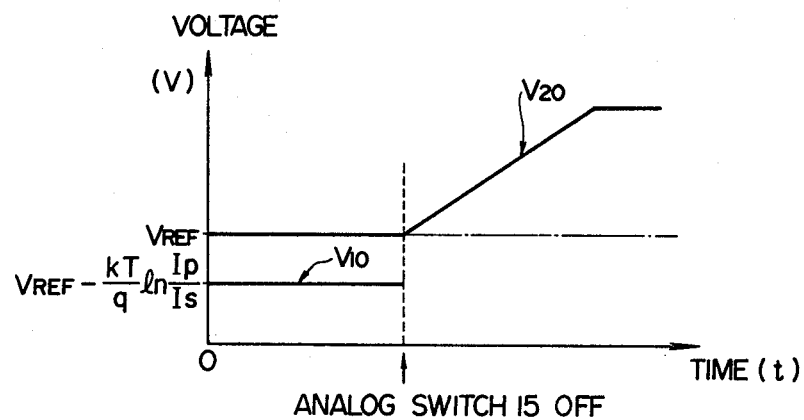
FIG. 6 is an output voltage waveform diagram of the photometric apparatus shown in FIG. 5.

In this case, as shown in FIg. 6, a logarithmic compression signal lower than the reference voltage $V_{REF}$ by a voltage $$\left( \frac{kT}{q} \ln \frac{Ip}{Is} \right)$$

is derived from the terminal 18.

Subsequently, upon shutter releasing the trigger signal is turned from the "H" level to the "L" level in synchronism with an initiation of running of a first shutter blind and the analog switch 15 is turned off. Consequently, the feedback loop for the first amplifier 11 is disconnected. Thereafter, the photocurrent Ip through the diode 14 is interrupted and a current flows through the channel l$_6$ so as to charge the capacitor 21 again. As a result, an output voltage $V_{20}$ which is fed from the second amplifier 13 forming the integration circuit 24 to the output terminal 19 is obtained as follows.

$$V_{20} = V_{REF} + \frac{Ip}{C} t \quad (6)$$

In the apparatus, as shown in FIG. 6, an integration signal having a voltage which gradually increases from the reference voltage $V_{REF}$ after the analog switch 15 is turned off can be obtained from the output terminal 19.

What is claimed is:

1. A photometric apparatus for a camera comprising: first and second operational amplifiers each having inverting and non-inverting inputs and an output; said first operational amplifier having its non-inverting input terminal supplied with a reference voltage;
said second operational amplifier having its inverting input terminal and its output terminal connected to the inverting input terminal of said first operational amplifier;
a diode for logarithmic compression and a semiconductor analog switch forming a series path between the output terminal of said first operational amplifier and the non-inverting input terminal of said second operational amplifier;
a logarithmic output terminal connected to a point along said series path; and
a photoelectric transducer element for a photometry purpose connected to at least one input terminal of said second operational amplifier and forming an integration circuit together with said second operational amplifier; in such a manner that a logarithmic compression signal for an exposure display of the camera is derived from the logarithmic output terminal and a photocurrent integration signal for an exposure control is derived from the output terminal of the second operational amplifier by operating said semiconductor analog switch with a trigger signal in synchronism with a signal for shutter releasing to decouple said first and second operational amplifiers.

2. A photometric apparatus according to claim 1 in which the integrating circuit is formed with the second operational amplifier and the photoelectric transducer element, having a junction capacitance which functions as an integration capacitor.

3. A photometric apparatus according to claim 2 in which the photoelectric transducer element is connected between the non-inverting input terminal of the second operational amplifier and the ground.

4. A photometric apparatus according to claim 1 in which the integration circuit is formed with the second operational amplifier, the photoelectric transducer element and an integration capacitor.

5. A photometric apparatus according to claim 4 in which the photoelectric transducer element is connected between the inverting and the non-inverting input terminal of the second operational amplifier and the integration capacitor is connected between the non-inverting input terminal of the second operational amplifier and the ground.

6. A photometric apparatus according to claim 1 in which the diode for logarithmic compression is connected to the non-inverting input terminal of the second operational amplifier, the semiconductor analog switch in series connection with said diode is connected to the output terminal of the first operational amplifier and a resistor of high resistance is connected between the junction between the diode and the analog switch and the inverting input terminal of the second operational amplifier.

7. A photometric apparatus for a camera comprising:
an operational amplifier having inverting and non-inverting inputs and an output;
a feedback circuit coupling said output and said inverting input;
a photoelectric transducer means including storage means coupled to said non-inverting input;
reference level means including logarithmic compression means for providing a predetermined reference level;
solid state switch means for coupling said reference level means to said storage means to substantially instantaneously bring said storage means to said reference level and responsive to a trigger signal synchronized with a shutter release to decouple said reference level means from said storage means.

8. The apparatus of claim 7 wherein said reference level means comprises a second operational amplifier coupled between a reference level and said logarithmic compression means.

9. The apparatus of claim 8 wherein the output of said first mentioned operational amplifier is coupled to an input of said second operational amplifier.

* * * * *

UNITED STATES PATENT AND TRADEMARK OFFICE
CERTIFICATE OF CORRECTION

PATENT NO.  : 4,473,744
DATED       : Sep. 25, 1984
INVENTOR(S) : Kazunori Mizokami It is certified that error appears in the above-identified patent and that said Letters Patent is hereby corrected as shown below:

Column 2, lines 58 and 63 change "photo-metric" to --photometric--.

Column 2, line 66 change "photo-electric" to --photoelectric--.

Column 5, line 60 change "throw" to --turn--.

Signed and Sealed this

Nineteenth Day of March 1985

[SEAL]

Attest:

DONALD J. QUIGG

Attesting Officer

Acting Commissioner of Patents and Trademarks